United States Patent
Aggias

[15] 3,674,892
[45] July 4, 1972

[54] INTERNALLY PLASTICIZED EPOXIDE RESINS OF TRIGLYCIDYL ISOCYANURATE, HYDROXY FUNCTIONAL URETHANE POLYMER AND POLYCARBOXYLIC ACID ANHYDRIDE

[72] Inventor: Zissis Aggias, Hilden, Germany
[73] Assignee: Henkel & Cie, GmbH, Dusseldorf, Germany
[22] Filed: Oct. 13, 1969
[21] Appl. No.: 866,017

[30] Foreign Application Priority Data

Oct. 31, 1968 Germany......................P 18 06 202.7

[52] U.S. Cl. ......................260/835, 260/22 EP, 260/22 TN, 260/37 EP, 260/37 N, 260/37 AL, 260/40 TN, 260/78.4 EP, 260/830 P
[51] Int. Cl. .....................................C08g 45/14, C08g 45/12
[58] Field of Search........................260/803 P, 835

[56] References Cited

UNITED STATES PATENTS

| | | |
|---|---|---|
| 3,238,273 | 3/1966 | Hampson..............................260/830 |
| 3,419,510 | 12/1960 | Hudak..................................260/830 |
| 3,525,779 | 8/1970 | Hawkins..............................260/830 |

*Primary Examiner*—Paul Lieberman
*Attorney*—Hammond and Littell

[57] ABSTRACT

A process for the preparation of internally plasticized hardened epoxide resin having increased flexibility without a substantial effect on its thermal properties which comprises the steps of reacting a mixture consisting essentially of (1) a crystalline triglycidyl isocyanurate having an epoxide oxygen content of at least 14 percent, (2) an organic polycarboxylic acid anhydride epoxide hardener, and (3) from 10 to 30 percent by weight, based on the amount of (1) and (2) above, of long-chain organic polyurethanes having at least two free hydroxyl groups per molecule and free of other reactive groups, said polyurethanes having a molecular weight between 800 and 5,000, under epoxide resin hardening conditions, and recovering said internally plasticized hardened epoxide resin.

7 Claims, No Drawings

INTERNALLY PLASTICIZED EPOXIDE RESINS OF TRIGLYCIDYL ISOCYANURATE, HYDROXY FUNCTIONAL URETHANE POLYMER AND POLYCARBOXYLIC ACID ANHYDRIDE

THE PRIOR ART

Hardened synthetic resins, based on organic compounds containing more than one epoxide group in the molecule frequently exhibit a very high resistance to deformation by heat. For example, crystalline triglycidyl isocyanurate shows this characteristic after being hardened with the usual epoxide resin hardening agents. On the other hand, this hardened epoxide resin often leaves much to be desired with regard to its mechanical properties evidenced by its impact strength and flexural strength. Its tendency to develop cracks with changes of temperatures renders it useless for various purposes. For example, if metal armatures with grooves and ridges are placed in a casting mixture consisting of crystalline triglycidyl isocyanurate and, for example, of polycarboxylic acid anhydrides, more or less large cracks will become evident with temperature changes. The mechanical, in particular, the elastic properties of such epoxide resins can be improved by an addition to the hardenable mixture of softeners or plasticizers. For, this purpose, "external plasticizers" have been considered; however, these involve certain disadvantages.

It is also known to prepare internally plasticized synthetic resins from crystalline triglycidyl isocyanurate and polycarboxylic acid anhydrides by reacting the crystalline triglycidyl isocyanurate with a minimum content of 14 percent of epoxide oxygen with carboxylic acid anhydrides and long-chained compounds having terminal free isocyanate groups. The latter compounds are prepared from OH-groups containing linear polyethers and/or polyesters and multivalent isocyanates. Here, the ratio of the OH-groups and isocyanate groups is chosen such that compounds which occur have free isocyanate groups and a molecular weight between about 800 and 3,000. There is no doubt that the results obtained with the aid of these compounds are technologically useful, although working with compounds having free isocyanate groups has various known disadvantages.

Moreover it is known, to achieve an internal plasticizing or flexibilization of epoxide resins through adding polyethers having OH-groups, such as polypropyleneglycol. The addition of polypropyleneglycol to synthetic resins obtained from crystalline triglycidyl isocyanurate, although causing an improvement of the mechanical properties, such as impact resistance or bending resistance is disadvantages in relation to the substantial decrease of the high temperature deformation resistance.

OBJECTS OF THE INVENTION

An object of the invention is to avoid these shortcomings of the plasticizing processes previously known and to establish a method which will effect a satisfactory flexibilization of the hardened epoxide resins with a relatively small loss of the thermal properties.

A further object of the invention is to develop a process for the preparation of internally plasticized hardened epoxide resin having increased flexibility without a substantial effect on its thermal properties which comprises the steps of reacting a mixture consisting essentially of (1) a crystalline triglycidyl isocyanurate having an epoxide oxygen content of at least 14 percent, (2) an organic polycarboxylic acid anhydride epoxide hardener, and (3) from 10 to 30 percent by weight, based on the amount of (1) and (2) above, of long-chain organic polyurethanes having at least two free hydroxyl groups per molecule and free of other reactive groups, said polyurethanes having a molecular weight between 800 and 5,000, under epoxide resin hardening conditions, and recovering said internally plasticized hardened epoxide resin.

These and other objects of the present invention will become more apparent as the description thereof proceeds.

DESCRIPTION OF THE INVENTION

The invention solves the task to achieve useful flexibilization of synthetic resins based on crystalline triglycidyl isocyanurate and polycarboxylic acid anhydrides, without the prior described disadvantages.

This task is solved by the invention in that polyurethanes containing OH-groups which were prepared from polyesters or from polyethers containing OH-groups and polyvalent isocyanates are added to the mixture of triglycidyl isocyanurate and carboxylic acid anhydrides.

According to the process of the invention, crystalline triglycidyl isocyanurate is used, prepared in well known manner. It should have an epoxide oxygen content of at least 14 percent. As a rule, technical mixtures of crystalline triglycidyl isocyanurate in high and low melting form are utilized. Crystalline triglycidyl isocyanurates having the above characteristics are described in U.S. Pat. No. 3,337,509, dated Aug. 22, 1967.

The condensation products containg OH-groups according to the invention are prepared from polyvalent organic isocyanates and long-chain organic compounds having at least two terminal hydroxyl groups, such as polyesters and/or polyethers containing OH-groups wherein the mol ratio of both components should be chosen in such a manner, that the condensation products having urethane groups as well as terminal OH-groups have a molecular weight between 800 and 5,000, particularly 1,000 and 3,000.

Preferably, low molecular weight organic diisocyanates, such as isomeric toluylene diisocyanates, diphenylmethane diisocyanates, isophorone diisocyanates, hexamethylene diisocyanates, the polyvalent isocyanates obtained from fatty acid chlorides, with the aid of the Curtius reaction, are used for the preparation of condensation products containing urethane groups. Also isocyanates can be used, which are prepared by the addition of 3 mols of toluylene diisocyanate to 1 mol of trimethylolpropane.

Preferably, as polyesters containing OH-groups, are relatively low molecular weight linear esterification products, such as may be obtained from alkanedioic acids having four to 20 carbon atoms, alkenedioic acids having four to 20 carbon atoms, benzene dicarboxylic acids, alkylbenzene dicarboxylic acids having from nine to 15 carbon atoms, cyclohexane dicarboxylic acids, cyclohexene dicarboxylic acids and alkylcyclohexane dicarboxylic acids having from nine to 15 carbon atoms, such as adipic acid, succinic acid, sebacic acid, phthalic acid, hexahydrophthalic acid, terephthalic acid, maleic acid, fumaric acid, with alkanediols having from two to 20 carbon atoms, alkanepolyols having from three to 6 carbon atoms and alkoxyalkanediols having from four to 20 carbon atoms, such as ethleneglycol, propyleneglycol, hexanediol, heptanediol, diethyleneglycol, neopentylglycol, butyleneglycol-1,3, trimethylolpropane, glycerine and hexanetriol. Also natural products containing OH-groups such as castor oil may be employed. Preferably linear polyethers containing OH-groups are well suited, for example polyglycols, for example, polyoxyalkylene glycols having molecular weights of from 150 to 4,500, such as polyethyleneglycol, polypropyleneglycol, polybutyleneglycol, and many others.

Condensation products having both non-terminal urethane groups as well as terminal OH-groups are most suitably used in such an amount as that 10 to 30 parts by weight of the condensation products are added for about 100 parts by weight of the mixture of crystalline triglycidyl isocyanurate and polycarboxylic acid anhydrides.

Customary known organic polycarboxylic acid anhydrides suitable as polyadduct formers for epoxide compounds are employed according to the invention as the carboxylic acid anhydrides. For instance, hexahydrophthalic acid anhydride, tetrahydrophthalic acid anhydride, phthalic acid anhydride, methylcyclohexanedicarboxylic acid anhydride, dodecenylsuccinic acid anhydride, pyrromellitic acid anhydride, endomethylenetetrahydrophthalic acid anhydride, methylendomethylenetetrahydrophthalic acid anhydride, etc., can be used. Naturally mixtures of the previously mentioned organic polycarboxylic acid anhydrides can also be used.

The amount of organic polycarboxylic acid anhydride to be used should be allotted in such a way, that 0.6 to 1.2 particularly 0.7 to 0.9 carboxylic acid anhydride groups are used in the hardenable mixture for each epoxide group.

The reaction components can be mixed and melted with each other in an arbitrary manner for the execution of the invention. Thus, liquid mixtures are obtained which can be maintained in a liquid state at temperatures of from about 50° to 80° C for a long period, without a gelatinization occurring. The liquid mixtures or pre-reaction products dissolve easily in organic solutions such as acetone, butyl acetate, methylene chloride and the like. They are suitable in this form for the impregnation of fibrous materials or as coating agents. Optionally, it is possible to coagulate these liquid mixtures by cooling and to employ them then in solid form after comminution as a fluidized bed sinter powder.

The actual reaction or cross-linking and hardening of the internally plasticized epoxide resins based on crystalline triglycidyl isocyanurate is carried out at elevated temperatures ranging between about 100° and 200° C., particularly 120° to 180° C., for 1 to 20, particularly 2 to 8 hours. In most cases, after this time the formation of the epoxide resin is completed. However it is advisable to temper the molded bodies for some time at elevated temperatures of from about 150° to 210° C. Fillers or dyes can be added to the mixtures according to the invention in known manner, such as for example, metallic powders, quartz powder, glass powder, glass fibers, mica, aluminum oxide, titanium oxide, zirconium oxide, ground dolomite or barium sulfate.

Most advantageously the synthetic resins prepared according to the invention may be employed as casting resins. It is possible with their aid, to mold complicated armatures, without any cracks occuring at the edges or grooves during the hardening process. The electrical properties of the hardened epoxide resins according to the invention do not show any decrease in comparison to the excellent values which are obtained from hardened molded bodies prepared from organic polycarboxylic acid anhydrides and crystalline triglycidyl isocyanurate. Compared to these, the molded bodies of the invention manifest superior impact resistance and bending resistance or flexural strength.

Furthermore, epoxide resins prepared according to the invention can be used as adhesives, cements and coatings.

The following specific embodiments are illustrative of the practice of the invention. They are not, however, to be deemed limitative in any manner.

In the following examples, the Martens temperature, the impact strength, the deflection and the surface leakage of current have been determined according to DIN 53,458, DIN 53,453, DIN 53,452 and DIN 54,380.

EXAMPLES

Preparation of the starting materials

OH-groups containing polyesters or OH-groups containing polyethers were introduced into a three-necked flask suppled with a stirrer and a thermometer and heated at 90° C. Within 15 to 30 minutes the diisocyanate was added at this temperature under a nitrogen atmosphere. In the first section of the following Table I the first column identifies the condensation product by the letter of the alphabet. The amount and the type of the compound containing the OH-groups and the diisocyanate follows.

TABLE I

| OH-group containing compound | Diisocyanate |
| --- | --- |
| A 200 gm of a polyester of adipic acid, phthalic acid, butylene-glycol and hexantriol, hydrooxyl content 5.1% | 19 gm of the condensation product of 3 mols of toluylene diisocyanate and 1 mol of trimethylolpropane |
| B 300 gm of a polyester of adipic acid, hexandiol-1,6, neopentylglycol and diethyleneglycol, OH-number 56 | 15 gm of diphenylmethane diisocyanate |
| C 100 gm of castor oil | 10 gm of toluylene diisocyanate |
| D 100 gm of castor oil | 19 gm of diphenylmethane diisocyanate |
| E 500 gm of polypropyleneglycol molecular weight 1000 | 70.4 gm of toluylene diisocyanate |
| F 300 gm of polytetrahydrofuran molecular weight 1000 | 33 gm of isophorone diisocyanate |
| G 300 gm of polytetrahydrofuran molecular weight 1000 | 26.4 gm of toluylene diisocyanate |

Preparation of molded bodies

Mixtures of 100 gm of triglycidyl isocyanurate (mixture of high and low melting forms; epoxide oxygen content 15.5 percent) and 140 gm of hexahydrophthalic acid anhydride were prepared and melted at a temperature of 110° C. To this mixture varying amounts of the condensation product made of the polyester or polyether and diisocyanate were added. After mixing, test bodies measuring 10 × 15 × 120 mm, were cast and hardened for 4 hours at a temperature of 110° C. and tempered for 16 hours at a temperature of 150° C.

The amount and the type of the condensation product is indicated in the first section of the following Table II. The values of the Martens temperature, the impact resistance, the bending resistance and the deflection follow thereafter. The surface leakage resistance amounted in all cases amounted to KA 3 c.

TABLE II

| polyurethane diol mixture in gm | Martens temperature °C | Impact resistance cm kp/cm² | bending resistance kp/mm² | deflection mm |
| --- | --- | --- | --- | --- |
| 0 | 170 | 14 | 620 | 4 |
| 40 gm A | 133 | 27 | 1280 | 9 |
| 40 gm B | 127 | 28 | 940 | 8 |
| 40 gm C | 122 | 25 | 1080 | 8.5 |
| 40 gm D | 117 | 23 | 1000 | 7.5 |
| 50 gm E | 104 | 26 | 900 | 9 |
| 40 gm F | 131 | 20 | 930 | 8 |
| 50 gm F | 107 | 28 | 970 | 10 |
| 50 gm G | 110 | 30 | 900 | 9 |

Comparative Test

Instead of the compounds to be used according to the invention, 50 gm of polypropyleneglycol(molecular weight 1,000) were added to the mixture. The Martens temperature fell to 85° C., whereas the impact resistance amounted to only 16 kp cm/cm² and the bending resistance amounted to 830 kp/cm².

The preceeding specific embodiments are illustrative of the practice of the invention. It is to be understood, however, that other expedients known to those skilled in the art can be employed without departing from the spirit of the invention.

I claim:

1. A process for the preparation of internally plasticized hardened epoxide resin having increased flexibility without a substantial effect on its thermal properties which consists essentially of the steps of reacting, at a temperature of between about 100° and 200° C. for 1 to 20 hours, a mixture consisting essentially of (1) a crystalline triglycidyl isocyanurate having an epoxide oxygen content of at least 14 percent, (2) an organic polycarboxylic acid anhydride epoxide hardener in an amount sufficient that from 0.6 to 1.2 carboxylic acid anhydride groups are present for each epoxide group in said triglycidyl isocyanurate, and (3) from 10 to 30 percent by weight, based on the amount of (1) and (2) above, of long-chain organic polyurethanes having at least two free hydroxyl groups per molecule and free of other reactive groups, said polyurethanes having a molecular weight between 800 and 5,000, and recovering said internally plasticized hardened epoxide resin.

2. The process of claim 1 wherein 0.7 to 0.9 carboxylic acid anhydride groups are present for each epoxide group.

3. The process of claim 1 wherein the molecular weight of said polyurethanes having at least two terminal hydroxyl groups is between 1,000 and 3,000.

4. The process of claim 1 wherein said long-chain, organic polyurethanes having at least two free hydroxyl groups per molecule and free of other reactive groups are selected from the group consisting of an excess of linear polyoxyalkylene glycols reacted with an organic diisocyanate and an excess of linear polyesters having at least two terminal hydroxyl groups reacted with an organic diisocyanate.

5. A process for the preparation of a stable, subresinous, heat-hardenable epoxide resin, which when hardened, has increased flexibility without a substantial effect on its thermal properties, which consists essentially of the steps of reacting a mixture consisting essentially of (1) a crystalline triglycidyl isocyanurate having an epoxide oxygen content of at least 14 percent, (2) an organic polycarboxylic acid anhydride epoxide hardener in an amount sufficient that from 0.6 to 1.2 carboxylic acid anhydride groups are present for each epoxide group in said triglycidyl isocyanurate, and (3) from 10 to 30 percent by weight, based on the amount of (1) and (2) above, of long-chain organic polyurethanes having at least two free hydroxyl groups per molecule and free of other reactive groups, said polyurethanes having a molecular weight between 800 and 5,000, at a temperature and for a time sufficient to melt said components, immediately cooling said melt to below 80° C., and recovering said stable, sub-resinous, heat-hardenable epoxide resin.

6. The stable, sub-resinous, heat-hardenable epoxide resin produced by the process of claim 5.

7. Heat-hardenable liquid composition comprising the stable, sub-resinous, heat-hardenable epoxide resin produced by the process of claim 5 dissolved in an organic solvent.

* * * * *